(12) United States Patent
Hearn et al.

(10) Patent No.: US 6,556,372 B2
(45) Date of Patent: Apr. 29, 2003

(54) HERMETICALLY SEALED DATA STORAGE DEVICE WITH DOUBLE SEAM SEAL

(75) Inventors: Patrick Hearn, Acton, MA (US); Kumaraswamy Kasetty, Northboro, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/096,387

(22) Filed: Mar. 11, 2002

(65) Prior Publication Data

US 2002/0114104 A1 Aug. 22, 2002

Related U.S. Application Data

(62) Division of application No. 09/281,744, filed on Mar. 30, 1999, now Pat. No. 6,392,838.

(51) Int. Cl.⁷ ............................................... G11B 33/14
(52) U.S. Cl. .................... 360/97.02; 29/603.03
(58) Field of Search .................... 360/97.01, 97.02, 360/97.03, 97.04, 98.01; 29/603.03

(56) References Cited

U.S. PATENT DOCUMENTS

| | | | | |
|---|---|---|---|---|
| 4,367,503 A | * | 1/1983 | Treseder | 360/133 |
| 5,301,075 A | | 4/1994 | Takemoto | 360/97.02 |
| 5,454,157 A | | 10/1995 | Ananth et al. | 29/603 |
| 5,793,566 A | * | 8/1998 | Scura et al. | 360/97.02 |

FOREIGN PATENT DOCUMENTS

| | | | |
|---|---|---|---|
| JP | 61-248280 | 11/1986 | 360/97.03 |
| JP | 61-292289 | 12/1986 | 360/97.03 |
| JP | 61-71078 | 4/1987 | 360/97.03 |
| JP | 62-137790 | 6/1987 | 360/97.03 |
| JP | 2-252182 | 10/1990 | 360/97.02 |
| JP | 4-149887 | 5/1992 | |
| JP | 5-159558 | 6/1993 | 360/97.02 |

OTHER PUBLICATIONS

"Seal for a Hermetically Sealed Disk File", IBM Tech. Disclosure Bul., vol. 27, No. 11, Apr. 1985, p. 6588.
"Casting Seals for Disk Files", IBM Tech. Disclosure Bul., vol. 33, No. 6A, Nov. 1990, pp. 366–367.
"Permation Limiting Gasket for Direct Access Storage Device", IBM Techn. Disclosure Bul., vol. 38, No. 5, May 1995, pp. 535–536.
"Sheet Metal Covered Seal", IBM Tech. Disclosure Bul., vol. 38, No. 12, Dec. 1995, pp. 107–111.

* cited by examiner

*Primary Examiner*—David L. Ometz
(74) *Attorney, Agent, or Firm*—David M. Sigmond

(57) ABSTRACT

Hermetic seals that maintain a data storage device atmosphere enable the use of alternate atmospheres to reduce the aerodynamic drag and turbulent excitation within the head/disk assembly (HDA). A metallic seal having a base layer and a plating layer is compressed between the data storage device cover and base such that the plating layer fills surface asperities of the cover and base to create a hermetic seal therein between. Alternatively, the data storage device is encased inside a metallic can formed by seam sealing two housings together. Alternatively, an epoxy seam is dispensed around the periphery of the data storage device base to seal the cover thereon. An O-ring acts as a barrier to isolate the epoxy from the HDA atmosphere.

54 Claims, 4 Drawing Sheets

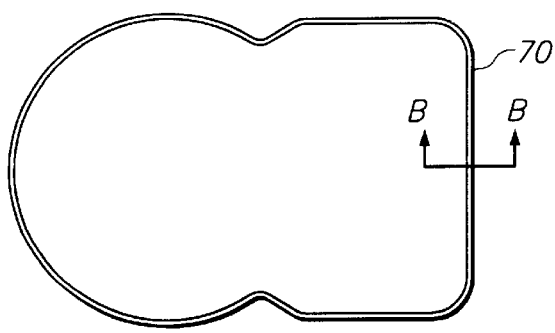
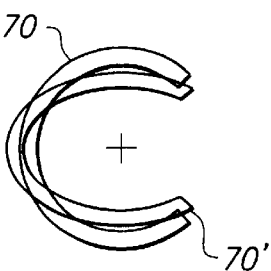
FIG. 4  FIG. 5  FIG. 6
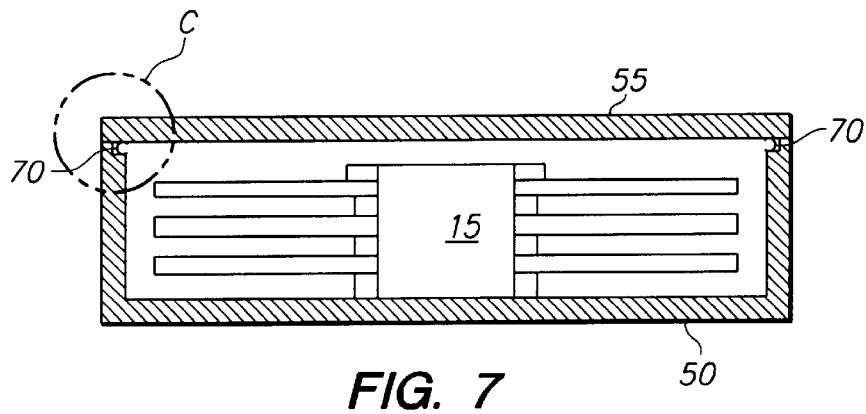
FIG. 7
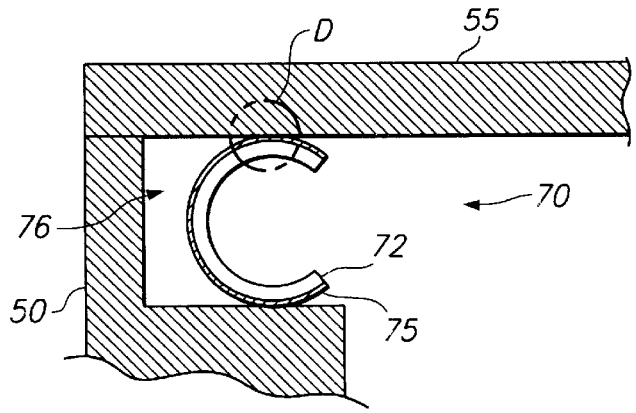
FIG. 8
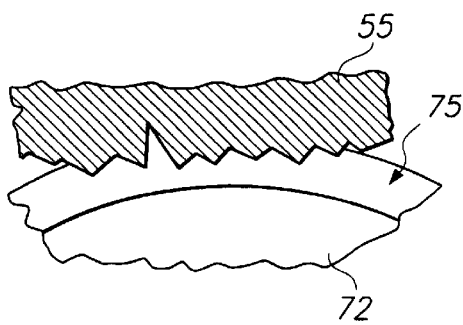
FIG. 9

HERMETICALLY SEALED DATA STORAGE DEVICE WITH DOUBLE SEAM SEAL

CROSS-REFERENCE TO RELATED APPLICATIONS

This application is a divisional of U.S. application Ser. No. 09/281,744, filed Mar. 30, 1999 now U.S. Pat. No. 6,392,838.

FIELD OF THE INVENTION

The present.invention relates generally to devices for storing data. More specifically, the present invention relates to disk drives that are hermetically sealed and the methods for providing such seals.

BACKGROUND

Disk drives are widely used in computers and data processing systems for storing information. These disk drives commonly use magnetic storage disks to store data in digital form. In order to obtain higher storage capacities, disk drives have evolved from utilizing a single rotating storage disk to utilizing a plurality of spaced apart rotating storage disks.

Each storage disk typically includes a data storage surface on each side of the storage disk. These storage surfaces are divided into a plurality of narrow, annular, concentric regions of different radii, commonly referred to as "tracks." Typically, an actuator assembly is used for precisely positioning a data transducer proximate the appropriate track on the storage disk to transfer information to and from the storage disk.

The need for increased storage capacity and compact construction of the disk drive has led to the use of smaller disks having increased track density, i.e., more tracks per inch. With these systems, the accurate and stable positioning of the data transducer proximate the appropriate track is critical to the accurate transfer and/or retrieval of information from the rotating storage disks.

As is well known in the art, the rotating storage disks are excited by internal and external vibration of the disk drive. This vibration causes axial motion in the rotating disks. Unfortunately, some of this axial motion is transferred to the data transducers. This can lead to errors in the transfer of data caused by the inaccurate positioning of the data transducer relative to the tracks on the rotating disks. This is commonly referred to as "track mis-registration (TMR)."

Moreover, the need to rapidly access information has led to disk drives having storage disks which are rotated at ever increasing speeds. Presently, disk drives having disks that rotate at about 7,200 RPM are currently available. However, high speed disk drives that rotate at 10,000 RPM or more RPM are presently being designed. At these high speeds, a significant portion of the internal vibration is caused by turbulent excitation of the head/disk assembly. Thus, the increased rotational speed of the storage disks often results in increased levels of vibration of the rotating disks and increased occurrences of TMR. Additionally, the higher RPMs generate more aerodynamic drag on the disks and increase drive power consumption.

It is known that alternate atmospheres surrounding the head/disk assembly (HDA) can reduce the magnitude of the aforementioned aerodynamic drag and turbulent excitation. For example, the use of helium is disclosed in U.S. Pat. No. 5,454,157. However, conventional disk drives use relatively permeable gaskets and seals in combination with a controlled diffusion filtered path to replenish the HDA as it gradually leaks outward. This type of conventional design prevents the use of alternate HDA atmospheres such as helium. In addition, known methods for hermetically sealing the HDA have yet to be successfully implemented.

Therefore, there exists a need for a hermetically sealed disk drive assembly that overcomes the drawbacks of the prior art.

SUMMARY

The present invention is directed to a hermetically sealed data storage device and the methods for hermetically sealing a data storage device e.g. a disk drive. According to a first embodiment of the present invention, a disk drive assembly is hermetically encased within a metallic can. The metallic can comprises a top housing and a bottom housing. Each housing includes a sealing flange extending around its periphery. After the disk drive assembly is securely placed into the bottom housing, the top and bottom housings are mated together and sealed together by forming a seam seal with the seal flanges.

According to a second embodiment, a metallic gasket having a C-shaped cross-sectional area is implemented to hermetically seal a disk drive assembly. The C-seal includes a base layer and a plating layer, with the length of the seal extending the periphery of the disk drive base, similarly to conventional elastomer gaskets. After the disk drive cover is placed over the disk drive base and C-seal, the cover is clamped, thus compressing the C-seal. The resulting compression forces the plating layer to fill surface asperities in the area of disk drive cover and base that contact the C-seal.

In a third embodiment, an epoxy seam is provided between the disk drive cover and base to hermetically seal the head/disk assembly. An O-ring type gasket is utilized to isolate the epoxy from the HDA.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2b is a simplified cross-sectional view of the bottom housing shown in FIG. 2a.

FIG. 2c is a simplified cross-sectional view of the top housing shown in FIG. 2a.

FIG. 3a is a magnified cross-sectional view of the seam seal area highlighted in region A in FIG. 2a.

FIG. 3b is a simplified view of the stages of forming the seam seal shown in FIG. 2a.

FIG. 4 is a top view of a C-seal in accordance with another embodiment of the present invention.

FIG. 5 is a cross-sectional view taken along line B—B of the C-seal of FIG. 4.

FIG. 6 is a cross-sectional view of the C-seal of FIG. 4 showing a compressed and uncompressed state.

FIG. 7 is a cross-sectional view of a disk drive assembly sealed with the C-seal of FIG. 4.

FIG. 8 is a magnified view of the C-seal area highlighted in region C in FIG.7.

FIG. 9 is a magnified view of the seal-cover interface highlighted in region D in FIG. 8.

FIG. 11b is a cross-sectional view of the connector pin assembly of FIG. 11a.

DESCRIPTION

A detailed description of the various components of a disk drive is provided in U.S. Pat. No. 5,208,712, issued to Hatch et al. and assigned to Maxtor Corporation, the assignee of the present invention. The contents of U.S. Pat. No. 5,208,712 are incorporated herein by reference. Accordingly, only the structural aspects of a disk drive which are particularly significant to the present invention are provided herein.

Figure 1:
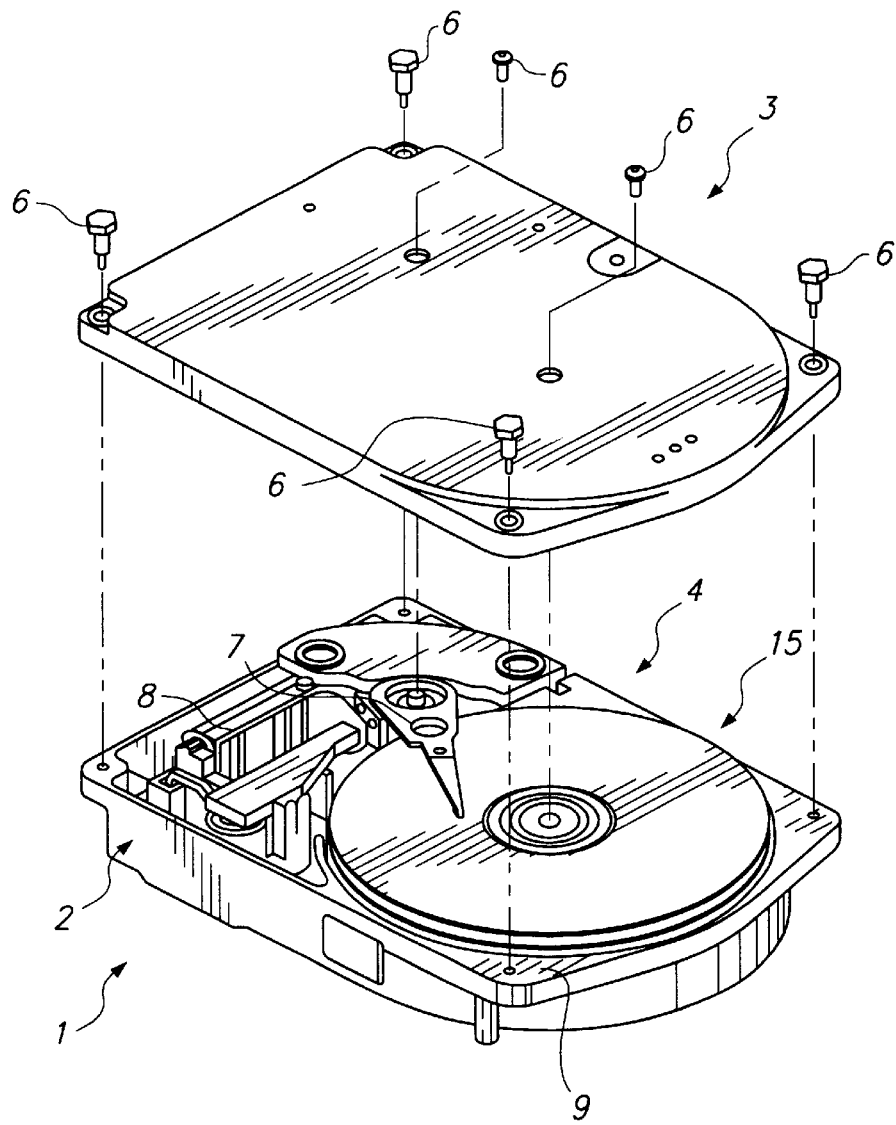
FIG. 1 is a perspective view of a conventional disk drive.

Initially, a conventional disk drive assembly 1 is shown in FIG. 1. The disk drive assembly 1 includes a baseplate 2 which houses the various components of a disk drive, including a disk assembly 15, actuator assembly 7, and electrical components 8. The baseplate 2 is enclosed by a cover 3 to create an enclosure therein between. A sealing gasket 9 is provided between the cover 3 and baseplate 2 as set screws 6 are typically used to secure the cover 3 to the baseplate 2. As previously mentioned, the sealing gasket 9 is typically permeable, and in conjunction with a filtered inlet (not shown) enable the replenishing of the disk drive internal environment.

Figure 2A:
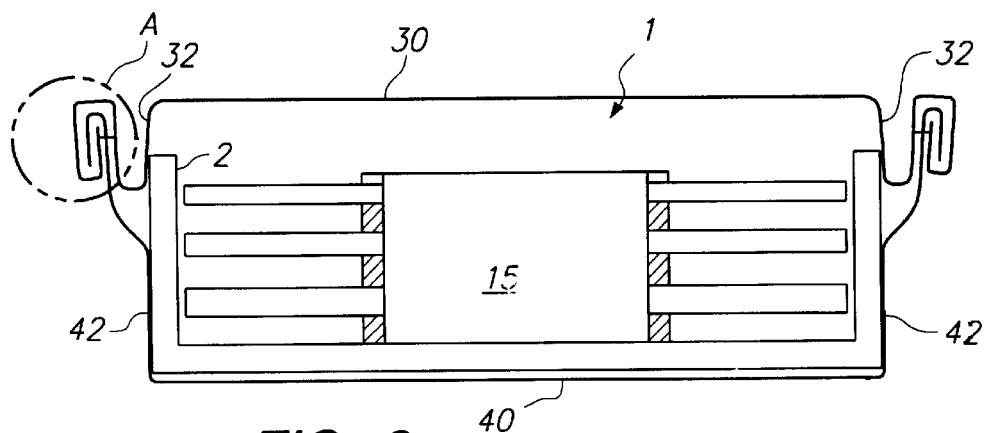
FIG. 2a is a cross-sectional view of a disk drive assembly sealed in accordance with one embodiment of the present invention.

FIG. 2a shows one embodiment of the present invention, for hermetically sealing a disk drive assembly 1. The disk drive assembly 1, including a baseplate 2 and a disk assembly 15 are enclosed within a metallic "can" including a bottom housing 40 and a top housing 30. When assembled, the metallic can is slightly larger, dimensionally, than the overall dimensions of the disk drive assembly 1. Bottom housing 40, shown in FIG. 2b, includes a base 43, four side walls 42 and a sealing flange 41 extending somewhat perpendicularly from the end of the side walls 42. Each side wall may be formed somewhat tapered away from the opposing side wall so that the disk drive assembly 1 may be securely press fit therein. Alternatively, the disk drive assembly 1 may be secured to the bottom housing 40 with spot welds or with a gasket. The sealing flange 41 has a width w of approximately 0.15 inches and extends around the periphery of the bottom housing 40.

Figure 2B:
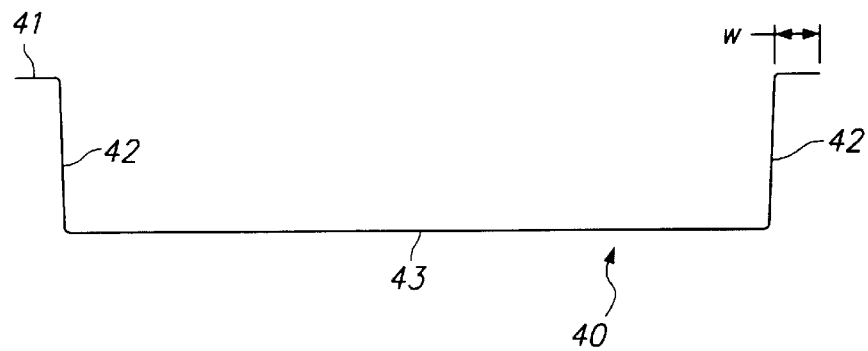
Figure 2C:
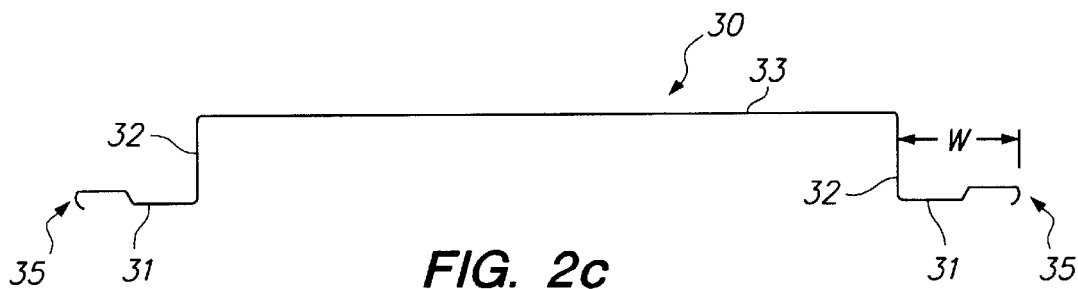

FIG. 2c shows top housing 30, including a cover 33, four side walls 32 extending from the cover 33 and sealing flange 31. Sealing flange 31 has a width W of approximately 0.20 inches, extending around the periphery of the top housing 30 and includes a curved end 35 formed at the end of the flange 31, which is necessary for forming a double seam seal.

Figure 3A:
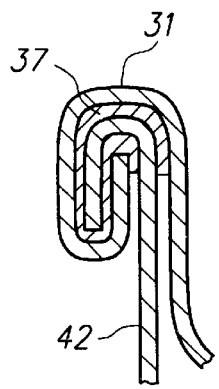

Top housing 30 and bottom housing 40 are preferably formed from a thin metallic (e.g. aluminum) sheet and into the configurations shown in FIGS. 2b and 2c. After the disk drive assembly 1 is secured to the bottom housing 40, the top housing 30 is mated over the bottom housing 40, enclosing the disk drive assembly 1 and forming an enclosure therein. To seal the top housing 30 to the bottom housing 40, a double seam sealing process, similar to that used in the beverage can industry, is utilized to form the resulting seal shown in FIG. 3a. Details of the seam sealing process are known to those skilled in the beverage can industry and thus are not included so as not to obscure the present invention.

Figure 3B:
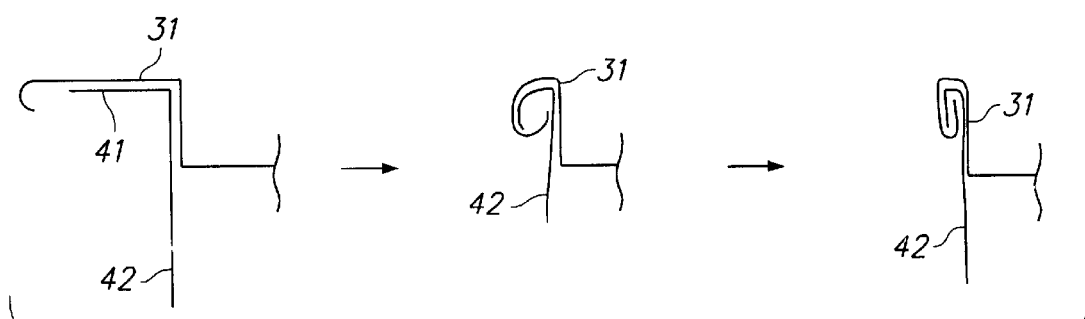

As shown, a sealing material 37 is placed and compressed therein between to hermetically seal the enclosure. The sealing material may be an elastomer gasket characterized by minimal outgassing. FIG. 3b shows the different stages of forming the double seam seal shown in FIG. 3a.

The actual dimensions of the top housing 30 and bottom housing 40 will vary depending on the overall dimensions of the specific data storage device. The foregoing dimensions are given for descriptive purposes only.

Figure 11A:
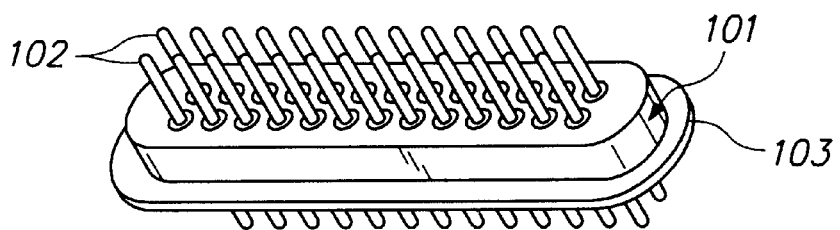
FIG. 11a is an isometric view of a connector pin assembly for providing electrical connections with the present invention.
Figure 11B:
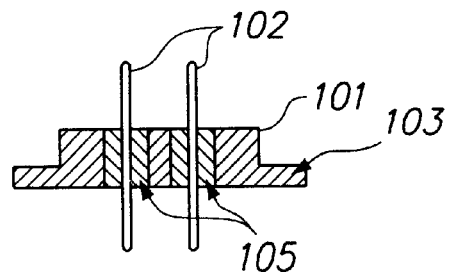

FIG. 11a shows an electrical connector pin assembly 100 that may be used in conjunction with the metallic can shown in FIG. 2a to provide electrical connections to the disk drive without effecting the integrity of the hermetic seal of the can. As shown, the connector pin assembly 100 includes a body 101 and a plurality of pins 102. The body 101 includes a flange area 103 which extends around the periphery of the body 101 and provides a positive stop to abut against the bottom housing 40 when the assembly 100 is inserted therein. The body 101 is preferably made of the same material as the bottom housing 40. The connector pin assembly 100 is inserted into an opening (not shown), dimensioned to snuggly receive the body 101, defined in the bottom housing 40 and may be secured therein with a suitable epoxy (not shown) to ensure a hermetic seal. The epoxy preferably has a coefficient of thermal expansion that is equivalent to that of the housing 40 and the body 101. Connector pins 102 extend from both sides of the body 101 to provide male connectors for the disk drive and a PC controller board. The location of the female connectors in the disk drive coincide with the opening in the bottom housing 40. As shown in FIG. 11b, each pin 102 is secured within openings in the body 101 by a suitable epoxy 105. The epoxy 105 provides hermetic integrity and preferably has a coefficient of thermal expansion equivalent to that of the body 101 material. As the body 101 is inserted into and secured to bottom housing 40, the connector pins 102 are inserted into female connectors in the disk drive assembly. The remaining externally exposed portions of pins 102 may then be connected to a PC controller board.

According to a second embodiment of the present invention, a metallic gasket is compressed between a disk drive cover 55 and base 50 to form a hermetic seal therein between. FIG. 4 shows a metallic seal 70 having a C-shaped cross-sectional area. The C-seal 70 is preferably formed in a shape to resemble known disk drive gaskets, i.e. one that follows the periphery of a disk drive base housing. The C-seal 70 is formed with a C-shaped cross-sectional area, as illustrated in FIG. 5. The C-seal 70 includes a base layer 72 and a plating layer 75. The base layer 72 is preferably made of an alloy, e.g. monel alloy or aluminum alloy, while the plating layer 75 is a thin layer of a soft metal e.g. lead, tin, gold that enables the C-seal 70 to be compressed into a compressed state 70', as shown in FIG. 6 without plastic deformation. As shown in FIGS. 7 and 8, the C-seal 70 is compressed between a disk drive cover 55 and base 50 to provide a hermetic seal. The C-seal 70 is placed within a channel 76 defined around the periphery of the base 50. As the cover 55 is placed over and secured to the base 50, using set screws (not shown), the compression force provided by the screws compresses the cover 55 and base 50 against C-seal 70 such that a meshing between the plating layer 75 and the base 50 and the cover 55 creates a hermetic seal within the enclosure inside the disk drive assembly. As further illustrated in the magnified view of FIG. 9, surface asperities in the cover 55 and base 50 are filled in by the plating layer 75 material to create the hermetic seal. Typically, a clamping force provided by a clamping apparatus is required to compress the C-seal, prior to securing the set screws to the disk drive cover 55. The necessary clamping force will depend on the thickness and compressibility of the C-seal 70. The base layer 72 is approximately 0.007 inches in thickness while the plating layer is approximately 0.002 inches thick. To ensure hermetic integrity over various operating conditions and ranges of temperature, the coefficient of thermal expansion of the plating layer 75 and base layer 72 are preferably compatible with that of the disk drive base 50 and cover 55.

Figure 10:
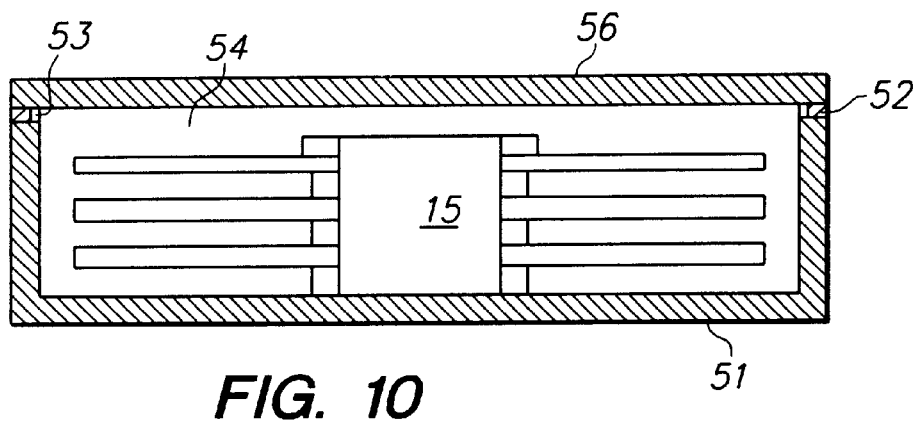
FIG. 10 is a cross-sectional view of a disk drive assembly sealed in accordance with another embodiment of the present invention.

A third embodiment of the present invention involves using a combination of a sealing gasket and an epoxy seam around the periphery of the disk drive cover-base interface. As shown in FIG. 10, a barrier 53, e.g. an O-ring, separates the epoxy 52 from the disk drive enclosure 54, preventing any possible outgassing from the epoxy 52 from entering the disk drive enclosure 54. Preferably, the epoxy will have a coefficient of thermal expansion that is compatible with that of the cover 56 and base 51

The above described embodiments have been shown to maintain the HDA atmosphere leak rate at less than 1 cc per $10^8$ seconds or 5% of the volume of HDA atmosphere over 10 years. As such the present invention is ideally suited to accommodate alternative disk drive atmospheres such as helium, which can reduce aerodynamic drag and turbulent excitation of the disks, thereby reducing the occurrence of TMR and also reducing disk drive power consumption.

Additionally, while the present invention has been described with respect to a disk drive, it should be understood that the present invention also finds utility in hermetically sealing other data storage devices e.g. optical, magneto-optical storage devices having various form factors e.g. 2.5", 3.5", 5.25", etc.

While the particular disk drive as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A data storage device, comprising:
   a base;
   a cover sized to fit over the base to form an enclosure therein between;
   a disk assembly in the enclosure and secured to the base;
   an actuator assembly in the enclosure and secured to the base; and
   a double seam seal around a periphery of the enclosure for attaching the base to the cover and hermetically sealing the enclosure to inhibit escape of a gaseous medium within the enclosure to an external ambient environment, wherein the double seam seal includes intertwined metal and the base and the cover do not contact one another.

2. The data storage device of claim 1, wherein the double seam seal protrudes outside and is spaced from sidewalls of the base and the cover.

3. The data storage device of claim 1, wherein the double seam seal includes a base flange around a periphery of the base and a cover flange around a periphery of the cover.

4. The data storage device of claim 3, wherein the base flange and the cover flange are intertwined with one another.

5. The data storage device of claim 4, wherein the base flange includes a distal end portion shaped as a hook, the cover flange includes a distal end portion shaped as a hook, and the distal end portions are intertwined with one another.

6. The data storage device of claim 5, wherein the base flange has a width that is smaller than a width of the cover flange.

7. The data storage device of claim 3, wherein the double seam seal includes a sealing material that contacts and separates the base flange and the cover flange.

8. The data storage device of claim 7, wherein the sealing material is an elastomer gasket.

9. The data storage device of claim 1, wherein the gaseous medium is helium.

10. A data storage device, comprising:
    a base;
    a cover sized to fit over the base to form an enclosure therein between;
    a disk assembly in the enclosure and secured to the base;
    an actuator assembly in the enclosure and secured to the base; and
    a double seam seal around a periphery of the enclosure that attaches the base and the cover, wherein the double seam seal includes a base flange, a cover flange and a sealing material, the base flange is integral with and extends around a periphery of the base, the cover flange is integral with and extends around a periphery of the cover, the sealing material contacts and separates the base flange and the cover flange, the base flange and the cover flange have hook-shaped distal end portions that are intertwined with one another, the double seam seal protrudes outside and is spaced from sidewalls of the base and the cover, the double seam seal is essentially coplanar with an exposed top major surface of the cover, and the double seam seal hermetically seals the enclosure, thereby inhibiting escape of helium within the enclosure to an external ambient environment.

11. A method of manufacturing a data storage device, comprising:
    providing a base;
    securing a disk assembly to the base;
    securing an actuator assembly to the base; and then
    forming a double seam seal including intertwining metallic elements, thereby attaching a cover to the base and creating a hermetically sealed enclosure to inhibit escape of a gaseous medium within the enclosure to an external ambient environment without contacting the base to the cover.

12. The method of claim 11, wherein the double seam seal protrudes outside and is spaced from sidewalls of the base and the cover.

13. The method of claim 11, wherein the double seam seal includes a base flange around a periphery of the base and a cover flange around a periphery of the cover.

14. The method of claim 13, wherein the base flange and the cover flange are intertwined with one another.

15. The method of claim 14, wherein the base flange includes a distal end portion shaped as a hook, the cover flange includes a distal end portion shaped as a hook, and the distal end portions are intertwined with one another.

16. The method of claim 15, wherein the base flange has a width that is smaller than a width of the cover flange.

17. The method of claim 13, wherein the double seam seal includes a sealing material that contacts and separates the base flange and the cover flange.

18. The method of claim 17, wherein the sealing material is an elastomer gasket.

19. The method of claim 11, wherein the gaseous medium is helium.

20. The method of claim 11, wherein the double seam seal includes a base flange, a cover flange and a sealing material, the base flange is integral with and extends around a periphery of the base, the cover flange is integral with and extends around a periphery of the cover, the sealing material contacts and separates the base flange and the cover flange, the base flange and the cover flange have hook-shaped distal end portions that are intertwined with one another, the double seam seal protrudes outside and is spaced from sidewalls of the base and the cover, the double seam seal is essentially coplanar with an exposed top major surface of the cover, and the gaseous medium is helium.

21. A data storage device, comprising:

a base;

a cover sized to fit over the base to form an enclosure therein between;

a disk assembly in the enclosure and secured to the base;

an actuator assembly in the enclosure and secured to the base; and a double seam seal around a periphery of the enclosure for attaching the base to the cover and hermetically sealing the enclosure to inhibit escape of a gaseous medium within the enclosure to an external ambient environment, wherein the double seam seal includes a sealing material that contacts and separates the base and the cover and protrudes outside and is spaced from sidewalls of the base and the cover.

22. A data storage device, comprising:

a base;

a cover sized to fit over the base to form an enclosure therein between;

a disk assembly in the enclosure and secured to the base;

an actuator assembly in the enclosure and secured to the base; and a double seam seal around a periphery of the enclosure for attaching the base to the cover and hermetically sealing the enclosure to inhibit escape of a gaseous medium within the enclosure to an external ambient environment, wherein the double seam seal includes an elastomeric gasket that protrudes outside and is spaced from sidewalls of the base and the cover.

23. A data storage device, comprising:

a base;

a cover sized to fit over the base to form an enclosure therein between;

a disk assembly in the enclosure and secured to the base;

an actuator assembly in the enclosure and secured to the base; and a double seam seal around a periphery of the enclosure for attaching the base to the cover and hermetically sealing the enclosure to inhibit escape of a gaseous medium within the enclosure to an external ambient environment, wherein the double seam seal protrudes outside and is spaced from sidewalls of the base and the cover.

24. A data storage device, comprising:

a base;

a cover sized to fit over the base to form an enclosure therein between;

a disk assembly in the enclosure and secured to the base;

an actuator assembly in the enclosure and secured to the base; and a double seam seal around a periphery of the enclosure for attaching the base to the cover and hermetically sealing the enclosure to inhibit escape of a gaseous medium within the enclosure to an external ambient environment, wherein the double seam seal is essentially coplanar with an exposed top major surface of the cover and protrudes outside and is spaced from sidewalls of the base and the cover.

25. A data storage device, comprising:

a base;

a cover sized to fit over the base to form an enclosure therein between;

a disk assembly in the enclosure and secured to the base;

an actuator assembly in the enclosure and secured to the base; and a double seam seal around a periphery of the enclosure for attaching the base to the cover and hermetically sealing the enclosure to inhibit escape of a gaseous medium within the enclosure to an external ambient environment, wherein the double seam seal protrudes outside and is spaced from sidewalls of the base and the cover, and the base and the cover do not contact one another.

26. The data storage device of claim 25, wherein the double seam seal includes a base flange around a periphery of the base and a cover flange around a periphery of the cover.

27. The data storage device of claim 26, wherein the base flange and the cover flange are intertwined with one another.

28. The data storage device of claim 27, wherein the base flange includes a distal end portion shaped as a hook, the cover flange includes a distal end portion shaped as a hook, and the distal end portions are intertwined with one another.

29. The data storage device of claim 28, wherein the base flange has a width that is smaller than a width of the cover flange.

30. The data storage device of claim 26, wherein the double seam seal includes a sealing material that contacts and separates the base flange and the cover flange.

31. The data storage device of claim 30, wherein the sealing material is an elastomer gasket.

32. The data storage device of claim 25, wherein the gaseous medium is helium.

33. A data storage device, comprising:

a base;

a cover sized to fit over the base to form an enclosure therein between;

a disk assembly in the enclosure and secured to the base;

an actuator assembly in the enclosure and secured to the base; and a double seam seal around a periphery of the enclosure for attaching the base to the cover and hermetically sealing the enclosure to inhibit escape of a gaseous medium within the enclosure to an external ambient environment, wherein the double seam seal includes a base flange around a periphery of the base and a cover flange around a periphery of the cover, the base flange and the cover flange are intertwined with one another, and the base and the cover do not contact one another.

34. The data storage device of claim 33, wherein the base flange includes a distal end portion shaped as a hook, the cover flange includes a distal end portion shaped as a hook, and the distal end portions are intertwined with one another.

35. The data storage device of claim 34, wherein the base flange has a width that is smaller than a width of the cover flange.

36. The data storage device of claim 33, wherein the double seam seal includes a sealing material that contacts and separates the base flange and the cover flange.

37. The data storage device of claim 36, wherein the sealing material is an elastomer gasket.

38. The data storage device of claim 33, wherein the gaseous medium is helium.

39. A method of manufacturing a data storage device, comprising:

provide a base;

securing a disk assembly to the base;

securing an actuator assembly to the base; and then forming a double seam seal, thereby attaching a cover to the base and creating a hermetically sealed enclosure to inhibit escape of a gaseous medium within the enclosure to an external ambient environment without contacting the base to the cover, wherein the double seam seal protrudes outside and is spaced from sidewalls of the base and the cover.

40. The method of claim 39, wherein the double seam seal includes a base flange around a periphery of the base and a cover flange around a periphery of the cover.

41. The method of claim 40, wherein the base flange and the cover flange are intertwined with one another.

42. The method of claim 41, wherein the base flange includes a distal end portion shaped as a hook, the cover flange includes a distal end portion shaped as a hook, and the distal end portions are intertwined with one another.

43. The method of claim 42, wherein the base flange has a width that is smaller than a width of the cover flange.

44. The method of claim 40, wherein the double seam seal includes a sealing material that contacts and separates the base flange and the cover flange.

45. The method of claim 44, wherein the sealing material is an elastomer gasket.

46. The method of claim 39, wherein the gaseous medium is helium.

47. The method of claim 39, wherein the double seam seal includes a base flange, a cover flange and a sealing material, the base flange is integral with and extends around a periphery of the base, the cover flange is integral with and extends around a periphery of the cover, the sealing material contacts and separates the base flange and the cover flange, the base flange and the cover flange have hook-shaped distal end portions that are intertwined with one another, the double seam seal is essentially coplanar with an exposed top major surface of the cover, and the gaseous medium is helium.

48. A method of manufacturing a data storage device, comprising:

providing a base;

securing a disk assembly to the base;

securing an actuator assembly to the base; and then forming a double seam seal, thereby attaching a cover to the base and creating a hermetically sealed enclosure to inhibit escape of a gaseous medium within the enclosure to an external ambient environment without contacting the base to the cover, wherein the double seam seal includes a base flange around a periphery of the base and a cover flange around a periphery of the cover and the base flange and the cover flange are intertwined with one another.

49. The method of claim 48, wherein the base flange includes a distal end portion shaped as a hook, the cover flange includes a distal end portion shaped as a hook, and the distal end portions are intertwined with one another.

50. The method of claim 49, wherein the base flange has a width that is smaller than a width of the cover flange.

51. The method of claim 50, wherein the double seam seal includes a sealing material that contacts and separates the base flange and the cover flange.

52. The method of claim 51, wherein the sealing material is an elastomer gasket.

53. The method of claim 48, wherein the gaseous medium is helium.

54. The method of claim 48, wherein the double seam seal includes a sealing material that contacts and separates the base flange and the cover flange, the base flange and the cover flange have hook-shaped distal end portions that are intertwined with one another, the double seam seal is essentially coplanar with an exposed top major surface of the cover, and the gaseous medium is helium.

* * * * *